US007232210B2

(12) United States Patent
Cho et al.

(10) Patent No.: US 7,232,210 B2
(45) Date of Patent: Jun. 19, 2007

(54) FOAM, METHOD OF FORMING THE FOAM, PRINT CARTRIDGE INCLUDING THE FOAM, AND PRINTING APPARATUS INCLUDING THE PRINT CARTRIDGE

(75) Inventors: Seo-hyun Cho, Seongnam-si (KR); Hyung-hyu Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/965,962

(22) Filed: Oct. 18, 2004

(65) Prior Publication Data

US 2005/0134662 A1 Jun. 23, 2005

(30) Foreign Application Priority Data

Dec. 17, 2003 (KR) ...................... 10-2003-0092506
Jun. 22, 2004 (KR) ...................... 10-2004-0046559

(51) Int. Cl.
*B41J 2/175* (2006.01)
*C08J 9/36* (2006.01)

(52) U.S. Cl. .......................................... 347/86; 521/53

(58) Field of Classification Search .................. 347/86, 347/87; 521/50, 53; 424/484
See application file for complete search history.

(56) References Cited

U.S. PATENT DOCUMENTS 5,841,455 A * 11/1998 Tanaka et al. ................ 347/87
6,402,412 B2 6/2002 Sukhna et al.
6,514,330 B1 2/2003 Kanaya
6,720,006 B2 * 4/2004 Hanke et al. ............... 424/484

FOREIGN PATENT DOCUMENTS

| | | | | |
|---|---|---|---|---|
| JP | 6-246841 | | | 9/1994 |
| JP | 406246841 | A | * | 9/1994 |
| JP | 07-331151 | | | 12/1995 |
| JP | 8-59280 | | | 3/1996 |
| JP | 408059280 | A | * | 3/1996 |
| JP | 409262989 | A | * | 10/1997 |
| KR | 2001-0078858 | A | | 8/2001 |
| KR | 2001-0078876 | | | 8/2001 |
| KR | 20-2003-0336123 | | | 12/2003 |

OTHER PUBLICATIONS

Chinese Office Action dated Aug. 11, 2006 issued in CN 2004101020653.

Office Action dated Nov. 18, 2005 of the Korean Patent Application No. 10-2004-0046559.

* cited by examiner

*Primary Examiner*—Anh T. N. Vo
(74) *Attorney, Agent, or Firm*—Stanzione & Kim, LLP

(57) ABSTRACT

A foam used in a print cartridge and a method of forming the same. The foam includes 0.1-5.0 wt % of silver nanoparticles, based on the total weight of the foam. The print cartridge has a deodorizing, antibacterial, and disinfectant function.

10 Claims, 1 Drawing Sheet

FOAM, METHOD OF FORMING THE FOAM, PRINT CARTRIDGE INCLUDING THE FOAM, AND PRINTING APPARATUS INCLUDING THE PRINT CARTRIDGE

CROSS-REFERENCE TO RELATED APPLICATIONS

This application claims priority from Korean Patent Application No. 2003-92506, filed on Dec. 17, 2003 and 2004-46559, filed on Jun. 22, 2004, respectively, in the Korean Intellectual Property Office, the disclosure of which is incorporated herein in its entirety by reference.

BACKGROUND OF THE INVENTION

1. Field of the Invention

The present general inventive concept relates to a foam used in a print cartridge and a method of forming the same. More particularly, the present general inventive concept relates to a deodorizing, antibacterial, and disinfectant foam including 0.1-5.0 wt % of silver nanoparticles, based on the total weight of the foam, and a method of forming the same.

2. Description of the Related Art

Generally, an inkjet printer is a device that dispenses picoliter-scale droplets of ink onto a paper using a thermal transfer method to create a text or an image. To dispense picoliter-scale droplets of ink, a head of an inkjet print cartridge is required to be minutely operated. Meanwhile, ink in an ink storage case of the cartridge is supplied to the head. Such a cartridge is fabricated in such a structure that supplies an appropriate volume of ink to the head, prevents a leakage of ink, and easily creates ink droplets.

FIG. 1 illustrates a cartridge commonly used in a conventional inkjet printing apparatus. The cartridge includes a case 10, a foam 11 packed in the case 10 and retaining ink, an ink supply unit 12 for supplying ink from the foam 11 to a head (not shown), a filter 13 for filtering ink to be ejected from the ink supply unit 12, and an air vent 14 through which an air comes in or goes out of the case 10 to facilitate the ejection of ink from the foam 11.

That is, the foam 11 having micropores is received in the case 10 in a state of being compressed. In this state, when the foam 11 absorbs a predetermined volume of ink, the inside of the case 10 is maintained in a negative pressure state by a capillary phenomenon that occurs in the micropores of the foam 11.

Meanwhile, an ink composition for an inkjet printer consists essentially of a colorant, a solvent, and an additive, and must have a desired jetting performance and a desired adsorptivity or absorptivity after jetting. In this respect, such an ink composition must reach an appropriate level in characteristics such as viscosity, surface tension, image vividness, jetting stability, drying time, blurring, storage stability, coloration, compatibility with a printer head and a recording medium, friction resistance, and water resistance of an image. Antibacterial, deodorizing, and disinfectant properties are also important properties necessary for the ink composition.

In this regard, an ink composition for a conventional inkjet printer includes silver particles to have antibacterial, deodorizing, and disinfectant properties. For example, WO 03/038002, Korean Patent Laid-Open Publication No. 2003-49007, and Japanese Patent Laid-Open Publication No. Hei. 7-331151 disclose an antibacterial ink composition including silver microparticles.

However, the tendency of a recent inkjet printing technology is toward gradual reduction of the amount of ink droplets to obtain high-resolution printing quality. Accordingly, nozzles from which ink droplets are ejected are being reduced in size. In this respect, the silver particles contained in such a conventional ink composition may cause clogging in micro-sized nozzles, thereby lowering print image quality.

SUMMARY OF THE INVENTION

The present general inventive concept provides a foam containing externally added silver nanoparticles, unlike a conventional technology in which silver nanoparticles are contained in an ink composition. Therefore, the foam can have antibacterial, deodorizing, and disinfectant properties, and at the same time, can ensure a high quality image with no clogging of nozzles.

Additional aspects and advantages of the present general inventive concept will be set forth in part in the description which follows and, in part, will be obvious from the description, or may be learned by practice of the general inventive concept.

According to an embodiment of the present general inventive concept, there is provided a foam containing externally added silver nanoparticles.

According to another embodiment of the present general inventive concept, there is provided a method of forming a foam, which includes: mixing a prepolymer, a polyol, a polymerization catalyst, silver nanoparticles, a surfactant, and a cell regulator, to obtain a molding composition; continuously loading the molding composition on a conveyor whose sidewalls defining a tunnel along a longitudinal direction of the conveyor; moving the loaded conveyor to mold a tack-free foam structure; and cutting the foam structure in a perpendicular direction to a bottom plane of the conveyor.

According to another embodiment of the present general inventive concept, there is provided a print cartridge including the foam described above.

According to yet another embodiment of the present general inventive concept, there is provided a printing apparatus including the print cartridge described above.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
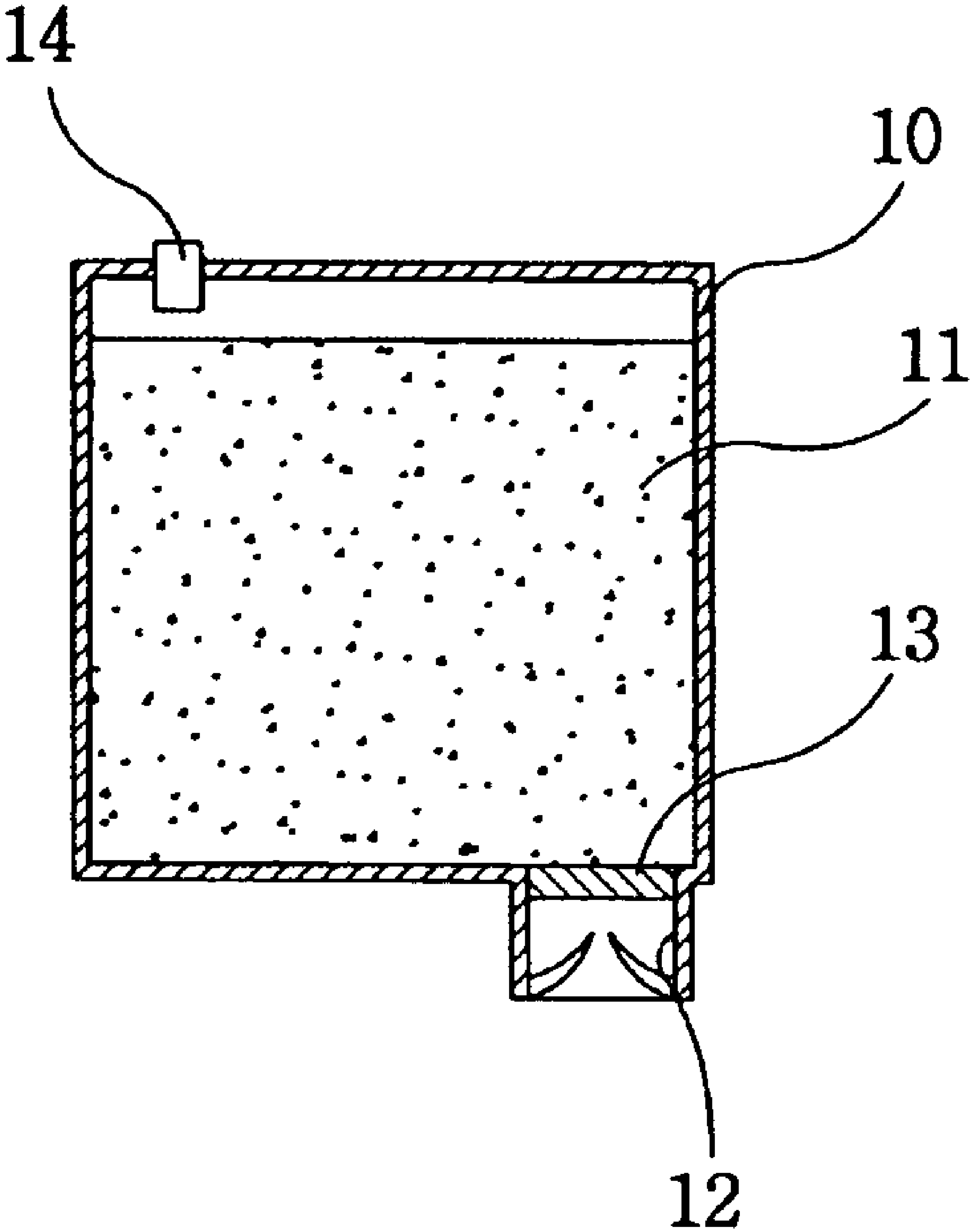
FIG. 1 is a conventional inkjet print cartridge packed with a conventional type foam.

Hereinafter, the embodiments of the present general inventive concept will be described in more detail. The embodiments are described below in order to explain the present general inventive concept.

An embodiment of the present general inventive concept provides a foam containing externally added silver nanoparticles. It is an aspect of the present general inventive concept that the silver nanoparticles are contained in the foam in an amount of 0.1-5.0 wt %, based on the total weight of the foam. If the content of the silver nanoparticles is less than 0.1 wt %, an antibacterial effect may be insufficient. On the other hand, if it exceeds 5.0 wt %, an antibacterial effect may be sufficient but a use of excess silver nanoparticles may be uneconomical.

In an aspect of the present general inventive concept, the silver nanoparticles have a primary particle size of 30 nm to 100 μm. If the primary particle size of the silver nanoparticles is less than 30 nm, it may be difficult to make the silver nanoparticles. On the other hand, if the primary particle size of the silver nanoparticles exceeds 100 μm, uniform dispersion of the silver nanoparticles in the foam may be difficult.

The foam may be made of a material commonly used in cartridge fabrication in the pertinent art. For example, the foam may be made of a material selected from a group consisting of polyester resin, polyurethane resin, amino resin, alkyd resin, phenolic resin, epoxy resin, isocyanate resin, polysiloxane resin, and a mixture thereof, but is not limited thereto. It is an aspect of the present general inventive concept to use a polyurethane foam.

The present general inventive concept also provides a method of forming a foam, which includes: mixing a prepolymer, a polyol, a polymerization catalyst, silver nanoparticles, a surfactant, and a cell regulator, to obtain a molding composition; continuously loading the molding composition on a conveyor whose sidewalls define a tunnel along a longitudinal direction of the conveyor; moving the loaded conveyor to mold a tack-free foam structure; and cutting the foam structure in a perpendicular direction to a bottom plane of the conveyor.

It is an aspect of the present general inventive concept, the material composition includes 10 to 100 parts by weight of the polyol, 0.01 to 20 parts by weight of the polymerization catalyst, 0.1 to 20 parts by weight of the silver nanoparticles, 0.1 to 50 parts by weight of the surfactant, and 0.1 to 20 parts by weight of the cell regulator, based on 100 parts by weight of the prepolymer.

It is an aspect of the present general inventive concept that the prepolymer is selected from a group consisting of toluene diisocyanate, diphenylenemethane diisocyanate, and a mixture thereof.

The polyol may be polyester-based polyol and/or polyether-based polyol. In formation of an inkjet printer foam, it is an aspect to use polyether-based polyol with excellent water resistance. Preferably, the polyol is used in an amount of 10 to 100 parts by weight, based on 100 parts by weight of the prepolymer. If the content of the polyol is less than 10 parts by weight, a polymer may be incompletely formed. On the other hand, if it exceeds 100 parts by weight, a residual amount of unreacted materials may increase.

The material composition also includes the polymerization catalyst to catalyze polymerization of the prepolymer. For example, in formation of a polyurethane foam, a catalyst for trimerization of an isocyanate prepolymer produced by reaction between organic polyisocyanate and aromatic monool may be used. In the present general inventive concept, in addition to the catalyst for the trimerization of the isocyanate prepolymer, various polymerization catalysts may be used according to a material of a desired foam. For example, the polymerization catalyst may be a tertiary amine such as dimethylhexylamine, dimethylcyclohexylamine, pentamethyldiethylenetriamine, dimethylethanolamine, tetramethylethylenediamine, tetramethylhexamethylenediamine, triethylenediamine, and tetramethylpropanediamine, its carboxylate or quaternary ammonium salt, or an organic metal compound such as dibutyltin dilaurate, lead octylate, potassium acetate, and potassium octylate. These catalysts may be used alone or in combination.

The polymerization catalyst may be used in an amount of 0.01 to 20 parts by weight, based on 100 parts by weight of the prepolymer.

The material composition also includes 0.1 to 20 parts by weight of the silver nanoparticles, based on the 100 parts by weight of the prepolymer. Preferably, the silver nanoparticles are contained in a finally obtained foam in an amount of 0.1 to 5.0 wt %, based on the total weight of the foam. In this regard, the silver nanoparticles are used in an amount of 0.1 to 20 parts by weight, based on 100 parts by weight of the prepolymer. As described above, the silver nanoparticles have a primary particle size of 30 nm to 100 μm.

The silver nanoparticles may be prepared by various methods such as mechanical grinding, co-precipitation, spraying, and sol-gel method. The silver nanoparticles may also be prepared by gradually adding an aqueous solution of a reducing agent and a surface surfactant to an aqueous silver salt solution. The reducing agent may be hydrazine, $NaBH_4$, $LiAlBH_4$, oxo compound, or a mixture thereof, but is not limited thereto. The surface surfactant may be different in terms of its type and concentration according to the size and size distribution of the silver nanoparticles. The surface surfactant may be a nonionic surfactant, an anionic surfactant, a cationic surfactant, a zwitterionic hydrocarbon-based surfactant, a silicon-based surfactant, or a fluorocarbon-based surfactant, but is not limited thereto.

The material composition also includes the surfactant and the cell regulator for cell opening to form a highly elastic foam. An appropriate surfactant may be one or more selected from trichlorofluoromethane, chlorine, fluoro, and methane. The cell regulator may be an organo-tin compound such as stannous octoate. In addition, various cell regulators may be used according to their characteristics.

Preferably, the surfactant is used in an amount of 0.1 to 50 parts by weight, based on 100 parts by weight of the prepolymer. If the content of the surfactant is less than 0.1 parts by weight, open cell formation may be difficult. On the other hand, if it exceeds 50 parts by weight, excess open cells may be formed, thereby deteriorating physical properties of the foam.

Preferably, the cell regulator is used in an amount of 0.1 to 20.0 parts by weight, based on 100 parts by weight of the prepolymer. If the content of the cell regulator is less than 0.1 parts by weight, a polymerization rate may be too slow. On the other hand, if it exceeds 20 parts by weight, the amount of an unreacted cell regulator may increase.

A method of forming an open cell foam according to an embodiment of the present general inventive concept includes forming a predetermined sized foam structure containing many oval cells grown and arranged by foaming, and cutting the foam structure in a major axis direction of the cells so that obtained foam pieces have a predetermined thickness in a minor axis direction of the grown cells.

In the method of forming the foam according to this embodiment, formation of the foam is initiated by continuously loading the molding composition on a conveyor whose sidewalls defining a tunnel, for example, of a rectangular shape. The loaded material composition is foam-formed while passing through a space defined by sidewalls of the tunnel to obtain a pillar-shaped foam structure. That is, the material composition, which has been ejected from a head of an ejector to an inlet of the space defined by the sidewalls of the tunnel, gradually expands with time during movement on the conveyor, and then reaches a slightly viscous gel state which is expanded more than a cream state. The gel state is changed to a tack-free state with no viscosity to form the pillar-shaped foam structure. At this time, molding components are foamed and a carbon dioxide gas is evacuated through the top of the space defined by the sidewalls. Therefore, open cells are expanded upward to form the foam structure containing Ag particles. The foam structure is cut in a perpendicular direction to a bottom plane of the conveyor to obtain final foam pieces with a predetermined thickness.

Preferably, the loaded conveyor moves for 10 minutes to 2 hours. If the movement time is less than 10 minutes, foam formation may be insufficient. On the other hand, if it exceeds 2 hours, a working time increase, which may render mass production difficult.

In another embodiment of the present general inventive concept, a print cartridge including the foam described above is provided. The cartridge of the present embodiment is packed with the foam formed as described supra. In addition, the cartridge absorbs a common volume of ink commonly used in the pertinent art.

In another embodiment of the present general inventive concept, a printing apparatus including the cartridge as described above is provided. The printing apparatus may be a printer, a facsimile, a multifunction device, or the like.

Hereinafter, the embodiments of the present general inventive concept will be described more specifically by Examples provided below. However, the following Examples are provided only for illustrations, and thus the embodiments of the present general inventive concept are not limited to or by the examples provided herein.

EXAMPLE 1

Preparation of Silver Nanoparticles 5 g of an aqueous solution containing 0.04 g of $AgNO_3$ was gradually added to 100 g of an aqueous solution containing 1.25 g of polyoxyethylene (20 moles) sorbitane monolaurate (Tween 20) as a surface surfactant and 0.07 g of hydrazine as a reducing agent with stirring. As a result, silver nanoparticles with an average particle size of 50 nm were obtained.

EXAMPLE 2

Formation of Foams According to an Embodiment of the Present General Inventive Concept.

A prepolymer produced by reaction between 50 g of organic polyisocyanate and 50 g of aromatic monool, 60 g of polyether triol as a polyol, 2 g of an isocyanate trimerization catalyst as a polymerisation catalyst, 2 g of silver nanoparticles with an average primary particle size of 100 nm, 20 g of trichlorofluoromethane as a surfactant, and 3 g of stannous octoate as a cell regulator were mixed to prepare a molding composition. The molding composition was continuously loaded on a conveyor whose sidewalls defining a rectangular tunnel (20 cm (width)×20 cm (length)×20 cm (height)) along a longitudinal direction of the conveyor. Tack-free foam structures were formed while the loaded conveyor moved for one hour. The foam structures were cut in a perpendicular direction to the bottom plane of the conveyor to obtain foams of a rectangular prism shape (1 m in width and 1 m in height).

EXAMPLE 3

Antibacterial Test

An antibacterial test was performed for solid pattern and halftone pattern images printed using cartridges packed with the foams of Example 2 and conventional cartridges with no silver nanoparticles as control. The results are summarized in Table 1 below.

TABLE 1

| | Reduction rate of bacteria (%) | |
|---|---|---|
| Section | Solid pattern | Halftone pattern |
| Example 2 | 99.8% | 99.8% |
| Control | 26.0% | 26.0% |

The antibacterial test was performed as follows. *Staphylococcus aureus* ATCC 6538 strains were cultured in a test solution of 35±1° C. for 24 hours and then counted. At an initial stage, the number of the strains was $1.4\times10^5$/ml. After the culture of 24 hours, the number of the strains reached $16.4\times10^6$/ml. The 24 hours-cultured solution was dropped on solid pattern- and halftone pattern-printed papers. Papers defined as 60×60 cm were used. After counting surviving strains at 24 hours after the dropping, the reduction rate of the strains was expressed as a percentage of the initial inocula, as presented in Table 1.

As seen from Table 1, the cartridges according to an embodiment of the present general inventive concept exhibited a superior antibacterial effect, as compared to the conventional cartridges with no silver nanoparticles.

As apparent from the above description, a print cartridge and a printing apparatus using the same according to embodiment of the present general inventive concept can exhibit antibacterial, deodorizing, and disinfectant properties, and at the same time, can ensure a high quality image with no clogging of nozzles.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A foam usable with a print cartridge to retain ink and supply the retained ink to an ink jet head without clogging a nozzles of the head the foam containing externally added silver nanoparticles integrally formed therein in an amount of 0.1 to 5.0 wt %, based on the total weight of the foam.

2. The foam of claim 1, wherein the silver nanoparticles have a primary particle size of 30 nm to 100 μm.

3. The foam of claim 1, wherein the foam is made of a material selected from a group consisting of polyester resin, polyurethane resin, amino resin, alkyd resin, phenolic resin, epoxy resin, isocyanate resin, polysiloxane resin, and a mixture thereof.

4. The foam of claim 1, wherein the foam is a polyurethane resin foam.

5. A print cartridge, comprising:

a case; and a foam usable with the print cartridge to retain ink and supply the retained ink to an ink jet head without clogging a nozzles of the head containing externally added silver nanoparticles integrally formed therein in an amount of 0.1 to 5.0 wt %, based on the total weight of the foam.

6. The print cartridge of claim 5, wherein the silver nanoparticles have a primary particle size of 30 nm to 100 μm.

7. The print cartridge of claim 5, wherein the foam is made of a material selected from a group consisting of polyester resin, polyurethane resin, amino resin, alkyd resin, phenolic resin, epoxy resin, isocyanate resin, polysiloxane resin, and a mixture thereof.

8. The print cartridge of claim 5, wherein the foam is a polyurethane resin foam.

9. A printing apparatus comprising the print cartridge of claim 5.

10. An image forming apparatus comprising the print cartridge of claim 5.

* * * * *